United States Patent Office 3,205,168
Patented Sept. 7, 1965

3,205,168
METHOD FOR COMPLETELY SEPARATING IONS BY USE OF ION EXCHANGE RESIN
Kazuhiko Mihara and Takashi Yamashiki, Yokohama, Japan, assignors to Asahi Kasei Kogyo Kabushiki Kaisha, a corporation of Japan
Filed Dec. 13, 1962, Ser. No. 245,359
Claims priority, application Japan, Mar. 6, 1962, 37/8,153
3 Claims. (Cl. 210—33)

The present invention relates to a method for completely separating ions into two groups by use of ion exchange resin and to apparatus for effecting such method. More particularly, the invention relates to a method for completely separating an objective ion from co-existing ion or ions by use of an ion exchange resin.

Separation and removal of ions using ion exchange resins (simply designated "resin" hereunder) are oftentimes practised at present. However, complete separation of ions into two groups has not as yet been successful.

When two ions are designated by the expression "objective" and "impurity," separation of the ions from each other is effected by adsorbing the impurity ion onto a resin having selectively adsorbing ability, and thus regenerating the resin by use of a regenerating liquor which can release the impurities from the resin. In this case, however, the objective ion is generally, adsorbed also onto the resin in the proportion corresponding to the liquid-resin equilibrium, because both the objective and impurity are ions. When this resin is regenerated, the adsorbed objective ion is transferred to the treated liquor during regeneration, causing loss of objective ion, i.e. separation of the objective ion from the impurity is incomplete. This is a significant disadvantage, especially when the objective ion is expensive or when the amount of impurity is large, so that the amount of resin used is large.

The inventor solves this problem by installing one vessel between the adsorbing vessel and the regenerating vessel, thereby utilizing the difference between the adsorbing equilibrium and regenerating equilibrium.

Figure 1:
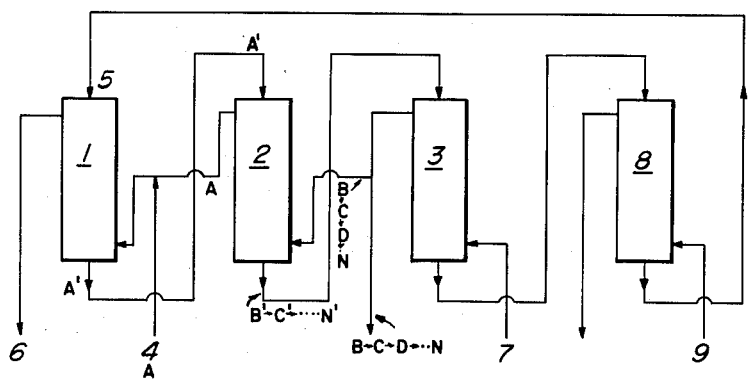
Figure 2:
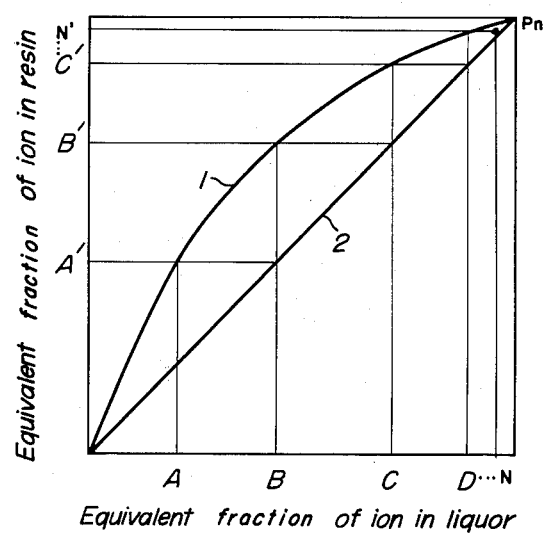

The method of the invention will be illustrated with reference to the accompanying drawing, wherein:

FIG. 1 is a diagrammatic illustration of ion exchange apparatus showing a flow diagram, and FIG. 2 is an equilibrium curve.

The ion exchange apparatus is of the movable bed type and is provided with a liquid-passing vessel for effecting ion exchange, a regenerating vessel for regenerating resin which has undergone ion exchange and a liquid washing vessel for washing regenerated resin. Each vessel has a bottom of conical shape, resin discharging means at the lowest level of the bottom of each vessel adapted to to feed discharged resin to another of said vessels; means for passing a liquid through said vessels with the resin therein, said resin being divided into two layers under the action of the pressure of said liquid, one of which layers is discharged from the corresponding vessel through the resin discharging means thereof and simultaneously with the liquid passing through said corresponding vessel, said means for passing liquid defining an inlet in the corresponding vessel which is centrally positioned therein, said two layers of resin being formed on opposite sides of said inlet with the liquid passing therethrough, liquid discharge means in communication with each said vessel at a level which is between the layers of resin for discharging liquid from each said vessel after stoppage of passing the liquid therethrough, and storage means at the top of each vessel in communication with one another for receiving resin from the discharge means of another vessel and for controllably introducing resin into the vessel associated therewith. The first adsorbing vessel, the second adsorbing vessel, and the first regenerating vessel are shown as 1, 2, and 3, respectively. A liquor 4 to be treated (containing an objective ion and an impurity ion) is fed to the first adsorbing vessel 1 at its lower part, along with the liquor treated in the second adsorbing vessel 2. The liquor 4 is contacted with the resin 5 charged into the top of the first adsorbing vessel 1, where the impurity ion and a part of the objective ion are adsorbed. Thus, the liquor 6 containing only objective ion is withdrawn from the upper part of the first adsorbing vessel 1. The resin having the impurity ion and a part of the objective ion adsorbed is discharged from the bottom of the vessel 1 and transferred to the top of the second adsorbing vessel 2. The liquor withdrawn from the first regenerating vessel 3 is fed to the lower part of the vessel 2 and withdrawn from the upper part. The resin contacted with this liquor contains only impurity ion adsorbed, and is discharged from the bottom of the vessel 2 and transferred to the first regenerating vessel 3. The liquor withdrawn from the upper part of the vessel 2 is passed to the first adsorbing vessel, along with a fresh liquor to be treated. In the first regenerating vessel 3, the resin having impurity ion adsorbed in the second adsorbing vessel 2 is charged at the top and contacted with a regenerating agent 7 fed from the lower part of the vessel 3. Further, the resin is regenerated in the second regenerating vessel 8 with a regenerating agent 9, and thereafter circulated to the first adsorbing vessel 1. In this procedure, any available ion exchange apparatus may be employed for each vessel. The liquor withdrawn from the first regenerating vessel contains almost only the impurity, and an amount of the liquor equivalent to the impurity in the liquor to be treated in the first adsorbing vessel is discharged outside of the system, and the remainder is transferred to the second adsorbing vessel. Thus, the objective ion and the impurity ion are substantially completely separated and removed from each other.

The mechanism, upon which the present invention is based, is explained with reference to the equilibrium curve shown in FIGURE 2, in which the horizontal axis is the equivalent fraction of objective ion and impurity ion in liquor and the vertical axis is the same in resin. In this case, the equilibrium relationship is represented by the curve 1 (convex on the upper side). Similarly, the equilibrium curve between the objective and impurity ions in the regenerating liquor is represented by the curve 2 (almost straight line).

At the start of the operation, resin contacted in the first adsorbing vessel with a liquid to be treated and having equivalent fraction of A has an equivalent fraction of A'. The resin is then sent to the second adsorbing vessel. Since there is no liquid fed to the vessel at the commencement of the operation, the resin is further sent to the regenerating vessel as such. In the regenerating vessel, the treated liquor comes to have the composition of B according to the proceeding of the reaction. In the conventional procedure, the liquor having the composition of B is withdrawn as the treated liquor in regeneration, in which the impurity and the equivalent amount of the objective is mixed.

In the present method, however, a part of the liquid B is fed to the second adsorbing vessel and contacted with the resin, and the latter is charged to the regenerating vessel after being changed to the composition of B'. In the regenerating vessel, the liquid treated comes to have the composition of C, a part of which is sent to the second adsorbing vessel and changed to the composition of C'.

Repeating this mechanism, the resin is regenerated in a form substantially completely composed of absorbed impurity ion, leaving a slight amount of the objective ion necessary to the proceeding of the reaction. Accordingly, the treated liquor withdrawn from the regeneration step contains nothing other than impurity, and the objective ion is substantially completely separated from the impurity.

The reaction as mentioned above proceeds on the basis of the equilibrium relationship, and there needs, therefore, no specific administration. The present invention is easily practised merely by installing a second adsorbing vessel between the adsorbing vessel and the regenerating vessel.

In the present invention, not only the case where the objective and the impurity are respectively of one kind of ion, but the case where each or both of them are more than one ions is practicable. For instance, when the separation of sodium chloride in sea water from the impurities, calcium and magnesium, is contemplated, the method of the invention is successful. If necessary, calcium and magnesium are separated from each other by repeating this process.

The method of the invention is further described with reference to the example, which is presented merely by way of illustration and not by way of limitation.

*Example*

This example illustrates an instance where sulfuric acid is separated and recovered from a waste acid which is by-produced in the production of titanium dioxide and which contains a large amount of ferrous sulfate besides sulfuric acid.

In FIGURE 1, the waste acid 4 to be treated is fed into the first adsorbing vessel 1, in which it is contacted with R–R type resin charged from the top of the vessel. The treated acid 6 containing only $H_2SO_4$ is withdrawn from the vessel. The resin which has adsorbed $Fe^{++}$ and a part of $H^+$ in the waste acid to be treated is discharged from the bottom of the vessel and charged to the upper part of the second adsorbing vessel 2, in which it is contacted with the treated liquor from the first regenerating vessel 3, which contains $FeSO_4$. The resin, almost completely changed to R–Fe type, is withdrawn from the vessel 2 and then fed to the top of the first regenerating vessel 3. The liquor treated in the second adsorbing vessel 2 is fed to the first adsorbing vessel, along with the waste acid. In the first regenerating vessel, the R–Fe type resin is contacted with a regenerating agent 7 to be changed to R–Na type and then transferred to the second regenerating vessel 8. The liquor treated in the first regenerating vessel 3, containing $FeSO_4$ is passed to the second adsorbing vessel, while the resin in the second regenerating vessel 8 is contacted with a regenerating agent ($H_2SO_4$) 9 to be changed to R–H type and recycled for reuse. The equivalent fractions in liquor and resin in the first adsorbing vessel are as follows.

|  | Liquid | Resin |
|---|---|---|
| $H^+$ | 0.840 | 0.46 |
| $Fe^{++}+Mg^{++}$ | 0.160 | 0.54 |

If the resin is regenerated as it is with $Na_2SO_4$ of about 100 gr./lit. the reaction proceeds in the equivalent proportion, and the liquor obtained in the regeneration treatment has the same equivalent fraction as in resin. However, when the procedure is conducted using the second adsorbing vessel according to the invention, the resin having the following equivalent fraction is obtained.

$H^+$, 0.12 meq./R–H ml., 0.05 equivalent fraction.
$Fe^{++}+Mg^{++}$, 1.98 meq./R–H ml., 0.95 equivalent fraction.

What is claimed is:

1. In a process for separating two different ions into two respective groups of ions by use of ion exchange resin by the contact of a liquor containing the two ions with an ion exchange resin in an adsorbing zone to separate a liquor containing one ion from resin having adsorbed thereon the other ion, and contacting the waste resin with a regenerating solution to regenerate the resin for reuse of the regenerated resin in the adsorbing zone, the improvement which comprises providing an additional adsorption zone between the aforesaid adsorbing and regenerating zones, wherein the additional zone is operative in accordance with an adsorption equilibrium curve, a regeneration equilibrium curve and the initial and final equivalent fraction of ions in the liquor, feeding a part of effluent liquor withdrawn from the regenerating zone in the additional zone in countercurrent with the waste resin charged therein from the first adsorption zone, the effluent from the additional zone being fed to the first adsorbing zone so that a mixture of said effluent from the additional zone and the liquor to be treated is fed into the first adsorbing zone, and passing the resin withdrawn from the additional zone in series into the regenerating zone.

2. Apparatus for separating ions in liquor to be treated into two separate groups, said apparatus comprising a first adsorption vessel, a second adsorption vessel, regeneration means, said vessels and regeneration means each having a liquor inlet and a resin inlet arranged such that the liquor and resin flow in counter-current and a resin outlet and a liquor outlet, means connecting the resin outlet of the first vessel with the resin inlet of the second vessel, means connecting the liquor outlet of the second vessel with the liquor inlet of the first vessel whereby liquor to be treated which is introduced into the first vessel will be initially combined with liquor from the second vessel, means connecting the resin outlet of the second vessel with the resin inlet of the regenerating means, means connecting the resin outlet of the regenerating means with the resin inlet of the first vessel, means connecting the liquor outlet of the regeneration means with the liquor inlet of the second vessel such that a portion of the liquor outlet of the regeneration means may be withdrawn from the apparatus while a portion may be supplied to the second vessel, and means for supplying a regeneration agent to the regeneration means at the liquor inlet of the regeneration means, the liquor withdrawn at the liquor inlet of the first vessel containing the ions of one group, while the liquor withdrawn from the apparatus at said regeneration means contains the ions of the other of said groups.

3. Apparatus as claimed in claim 2 wherein said regeneration means comprises first and second regeneration vessels wherein the resin outlet of the first vessel is connected to the resin inlet of the second vessel and separate liquor inlets are provided for each vessel for respective regenerating agents.

References Cited by the Examiner

UNITED STATES PATENTS 2,754,261 7/56 Akeroyd _____ 210—34
2,841,550 7/58 Beohner _____ 210—37

OTHER REFERENCES

"Text" Ion Exchange Technology, copyright 1956 by Academic Press Inc., 125 East 23rd St., New York 10, New York, edited by Nachod and Schubert, pages 204–218 relied upon, particularly page 205.

MORRIS O. WOLK, *Primary Examiner.*